United States Patent
Ho

(10) Patent No.: US 7,192,144 B2
(45) Date of Patent: Mar. 20, 2007

(54) BI-DIRECTIONALLY ACTUATED THIN MEMBRANE MIRROR

(75) Inventor: James G. Ho, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 172 days.

(21) Appl. No.: 10/999,740

(22) Filed: Nov. 30, 2004

(65) Prior Publication Data

US 2006/0114585 A1 Jun. 1, 2006

(51) Int. Cl.
*G02B 5/08* (2006.01)
*G02B 26/00* (2006.01)

(52) U.S. Cl. ........................... 359/846; 359/295
(58) Field of Classification Search ........... 359/846, 359/847, 290, 291, 295
See application file for complete search history.

(56) References Cited

U.S. PATENT DOCUMENTS

| 5,170,283 | A | 12/1992 | O'Brien |
| 6,639,710 | B2 * | 10/2003 | Kurczynski et al. ........ 359/290 |
| 6,682,199 | B2 * | 1/2004 | Kaneko ..................... 359/846 |
| 2003/0063401 | A1 | 4/2003 | Kurczynski |
| 2005/0030438 | A1 | 2/2005 | Nishioka |

* cited by examiner

*Primary Examiner*—Alessandro Amari
(74) *Attorney, Agent, or Firm*—Carmen B. Patti & Assoc., LLC

(57) ABSTRACT

A deformable membrane mirror and a related method for its use, the mirror including a deformable membrane having a reflective front face and a back face, and further including electrodes located on both sides of the membrane, to provide a desired surface contour without imparting a concave bias to the membrane. The electrodes include a first set of electrodes spaced from the back face of the membrane, and at least one additional electrode spaced from the front face of the membrane.

9 Claims, 6 Drawing Sheets

BI-DIRECTIONALLY ACTUATED THIN MEMBRANE MIRROR

BACKGROUND OF THE INVENTION

This invention relates generally to deformable mirrors and, more particularly, mirrors of which the surface can be rapidly changed in contour. The deformable mirror is a key component in adaptive optics systems for various applications. For laser directed energy weapons, adaptive optics systems may be used to compensate for optical wavefront distortions caused by transmission of a laser beam through the atmosphere. Similarly, many large aperture telescopes employ adaptive optics to compensate for atmospheric turbulence. There are also a number of commercial products that employ adaptive optics to map imperfections in the human eye and provide a tool for adjusting vision correction procedures.

All of these applications have in common the need to control the surface contour of a mirror in real time, i.e., rapidly enough to compensate for changes as they occur. A deformable mirror uses a matrix of individually controlled actuators, usually mounted behind the mirror surface. In one common type, the actuators are bi-directional pistons, each of which moves an assigned segment or region of the mirror. The mirror surface may extend continuously across the actuators or may consist of independently movable mirror segments with small gaps between the segments. In the latter type, movement of any one actuator has no influence on any other segments. Although this arrangement simplifies control of the actuators, the gaps between mirror segments are unacceptable for most applications that use laser beams. In the former type, in which a continuous mirror surface is controlled by independent bi-directional actuators, movement of any one actuator will also influence neighboring surface regions to some degree. An overwhelming drawback to the use of independently controlled bi-directional actuators is the relatively high cost of manufacture and assembly of the actuators.

A less costly alternative is to use a thin membrane to support the deformable mirror surface and to employ electrostatic actuators beneath the mirror surface, rather than electromechanical or piezoelectric actuators. In addition to having a relatively low cost, the thin membrane mirror surface has no discontinuities and, therefore, minimizes optical distortions between adjacent mirror regions controlled by separate actuators. Because of its advantages over more expensive mirrors, the thin membrane mirror is widely used in many adaptive optics applications.

Unfortunately, however, the continuity of the thin membrane mirror gives rise to a significant, and sometimes critical, disadvantage. Each actuator affects not only the membrane region immediately above the actuator but, to a lesser degree, it also affects every other region of the membrane as well. In other words, in addition to the desired local deformations produced by selective operation of one or more of the actuators, the entire membrane is deformed to a significant degree in a downward direction. (For convenience of discussion, it is assumed that the deformable mirror is oriented horizontally, with actuators mounted beneath the mirror surface. It will be understood, of course, that the mirror may have any desired orientation.)

The downward deformation of the entire membrane results in a concave and generally parabolic bias to the membrane. In many applications, the optical focus resulting from this concave bias may be removed by adding a corrective lens. This is usually not an acceptable solution, however, because the degree of the concave bias will vary with the current need for deforming the mirror to effect wavefront corrections. For a wavefront that requires no correction at a certain instant in time, no actuators are in operation and the membrane remains perfectly flat. Obviously, at this time no concave bias exists in the membrane and no compensation for concave bias is needed. As soon as one or more actuators pull down on the membrane to produce a desired distortion of the mirror, the concave bias of the mirror must be taken into account. One way to do this is to compensate for the bias with an adjustable rather than a fixed lens, but this obviously adds another layer of complexity to the mirror.

An example of the prior art deformable mirror system illustrated in FIGS. 1–3 is taught in some detail by U.S. Pat. No. 6,108,121, entitled "Micromachined High Reflectance Deformable Mirror."

It will be appreciated, therefore, that there is a need for a deformable mirror of the thin membrane type that can be deformed not only to compensate for wavefront distortions in an incident light beam, but also to compensate for the concave bias that is inherent in thin membrane deformable mirrors. The present invention accomplishes this goal.

SUMMARY OF THE INVENTION

The present invention resides in a thin membrane deformable mirror that is actuated bi-directionally and avoids the significant disadvantage of thin membrane mirrors. Briefly, and in general terms, the thin membrane deformable mirror of the present invention comprises a deformable membrane having a mirrored front face and a back face; a mirror frame for supporting the deformable membrane; and a set of independently controllable electrodes spaced from the back face of the membrane; at least one additional electrode spaced from the front face of the membrane. Finally, the mirror includes means for applying actuating electrical voltages to the set of electrodes, to deform the membrane to a desired surface profile needed to apply wavefront corrections to an optical beam impinging on the mirror, and to the at least one additional electrode, to compensate at least in part for any concave bias in the surface profile resulting from actuation of the set of electrodes.

More specifically, the mirror also comprises a substrate supporting the set of electrodes spaced from the back face of the membrane; and a spacer member supported on the substrate. The deformable membrane is, in turn, supported on the spacer member, to maintain the set of electrodes at a desired distance from the deformable membrane. Preferably, the mirror also includes an aperture plate supported on the frame and providing support for the additional electrode. The aperture plate has an aperture through which the optical beam is directed. In the thin membrane deformable mirror as disclosed, the deformable membrane has a conductive layer on its back face.

The invention may also be defined as a method for deforming a thin membrane deformable mirror, comprising the steps of holding a deformable membrane in a mirror frame, the deformable membrane having a mirrored front face and a back face; locating a set of electrodes in spaced relation to the back face of the deformable membrane; locating at least one additional electrode in spaced relation to the front face of the deformable membrane; applying voltage control signals to the set of electrodes and to the at least one additional electrode; and deforming the deformable mirror to attain a surface profile to effect wavefront corrections to an optical beam impinging on the mirror, without imposing a concave bias on the surface profile.

It will be appreciated from the foregoing summary, that the invention provides a significant advance in the field of deformable mirrors. In particular, the invention improves the characteristics of a thin membrane mirror by providing at least one pull-up electrode that compensates for the concave bias that is inherent in thin deformable membranes of the prior art. Other aspects and advantages of the invention will become apparent from the following more detailed description, taken in conjunction with the accompanying drawings.

DETAILED DESCRIPTION OF THE INVENTION

Figure 1:
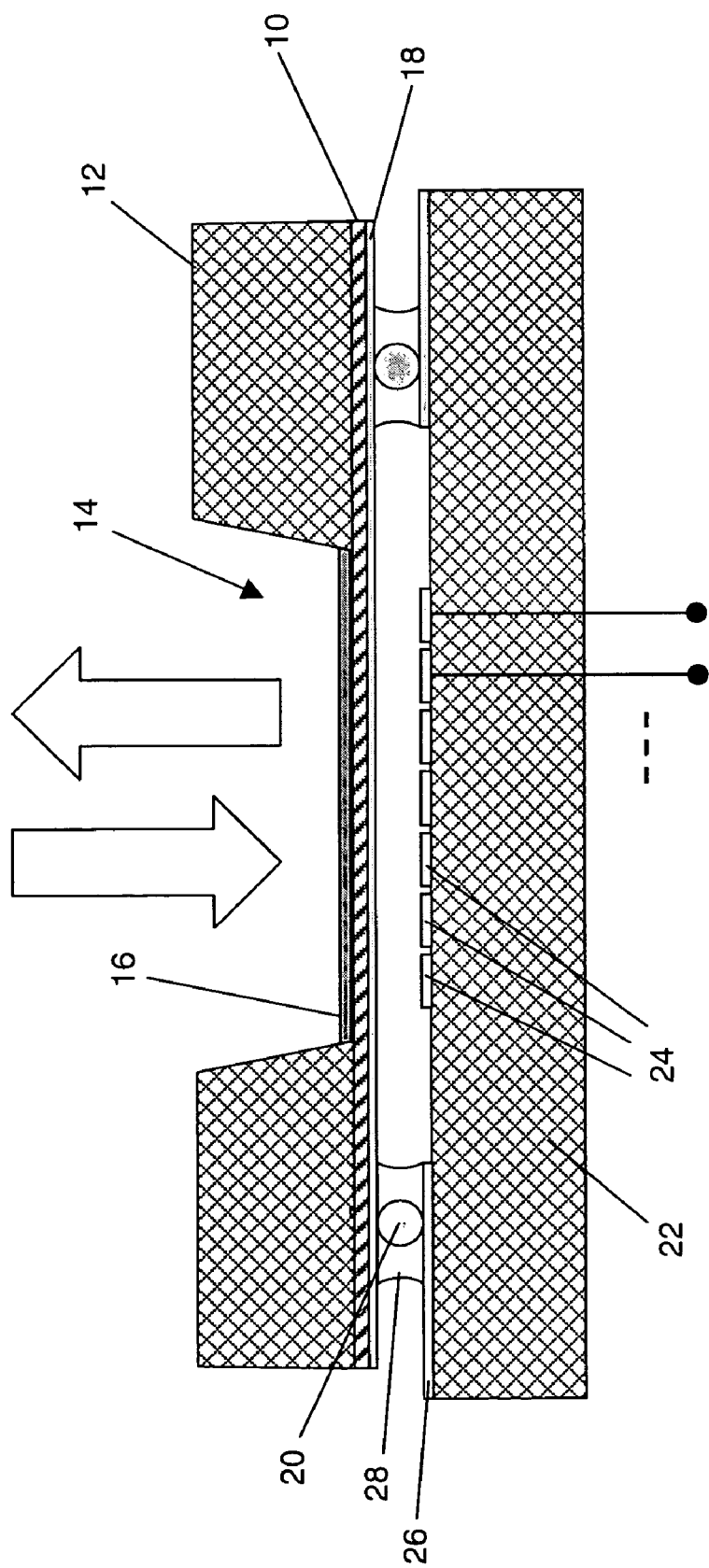
FIG. 1 is cross-sectional view of conventional thin membrane deformable mirror or the prior art.
Figure 2:
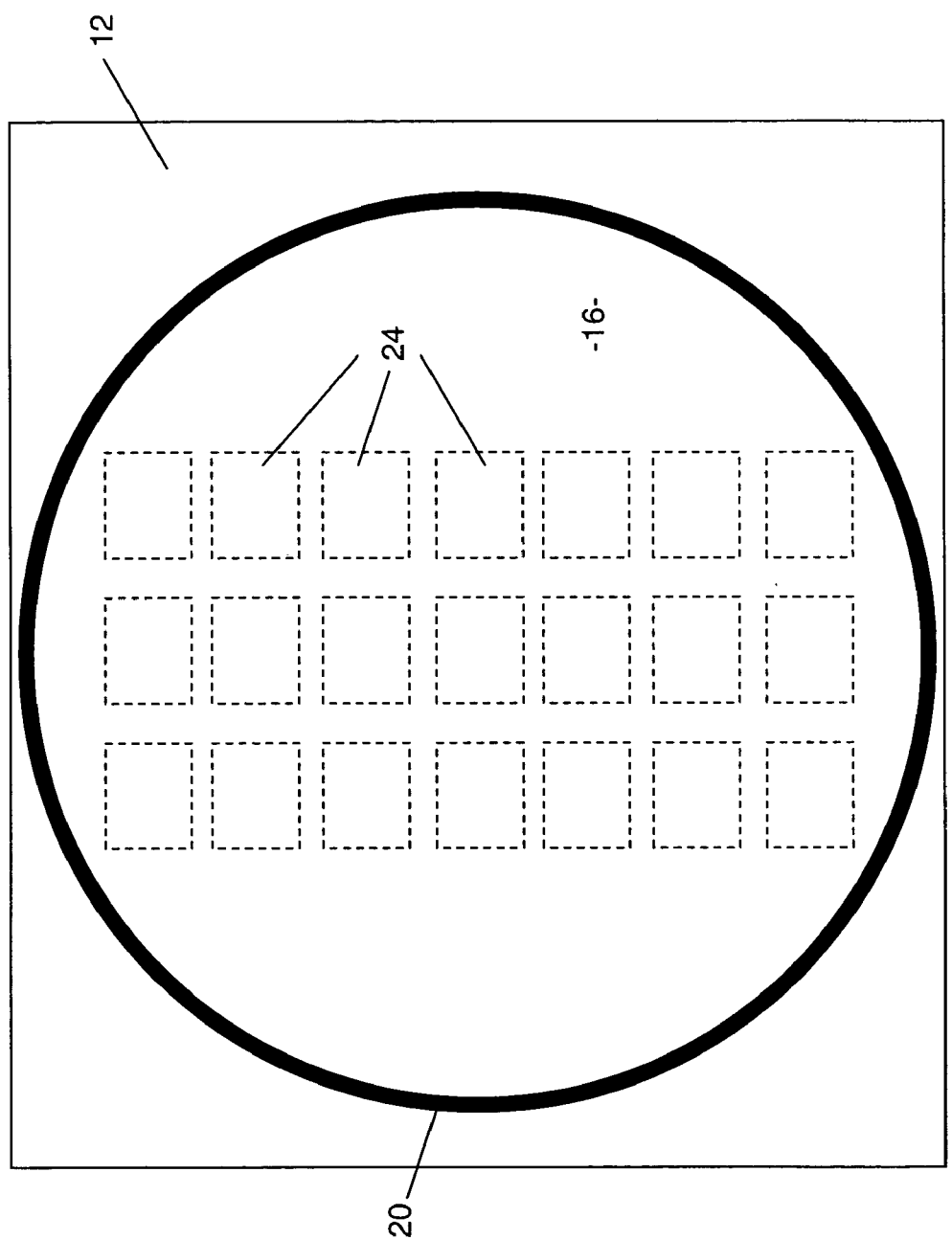
FIG. 2 is a plan view of the prior art mirror of FIG. 1.
Figure 3:
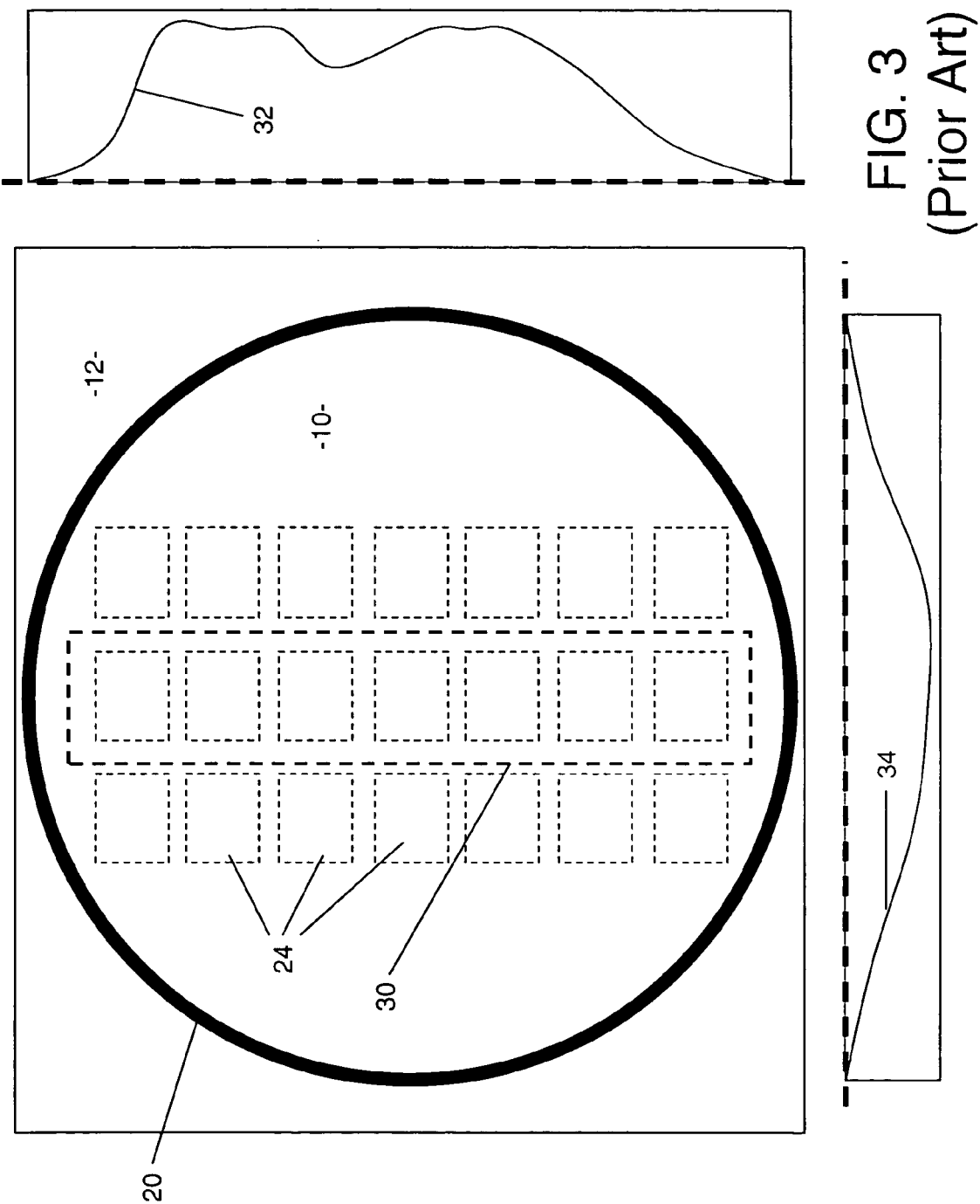
FIG. 3 is a plan view similar to FIG. 2, but also showing an optical input beam footprint and the mirror surface profiles in two perpendicular directions across the mirror.

As shown in the drawings for purposes of illustration, the present invention pertains to thin membrane deformable mirrors. FIGS. 1–3 depict a typical thin membrane deformable mirror of the prior art, which will be discussed first.

As best seen in FIG. 1, a typical thin membrane deformable mirror structure includes a mirror membrane, indicated by reference numeral 10, mounted in a mirror frame 12. By way of example, the membrane 10 may be of silicon nitride material, with a thickness of approximately 1 micron (1 µm) and the frame 12 is of silicon material of thickness approximately 0.5 mm. The frame 12 surrounds a mirror region 14, in which the membrane 10 has a reflective coating 16 formed over its upper or front face. The lower or back face of the membrane 10 is coated with an electrically conductive coating 18, using a material such as gold. A precisely dimensioned glass spacer bead 20 extends around the frame 12 and provides a desired uniform spacing between the conductive coating 18 and a pad array substrate 22. Specifically, the pad array substrate 22 has an array of gold conductive pads 24 formed on its upper surface, and a gold coating 26 of approximately the same thickness as the pads, extending about the periphery of the upper surface of the pad array substrate 22. The glass spacer bead 20 provides a desired spacing between the conductive coating 18 under the membrane 16 and the coating 26 around the pad array substrate 22. More importantly, the glass spacer bead 20 determines the spacing between the conductive coating 18 under the membrane 16 and the actuator pads 24. For example, the spacer bead 20 may be 40 µm in diameter and is held in place by a solder or epoxy bond 28, which also effectively joins the membrane 10 and the pad array substrate 22.

As best shown in FIG. 2, the actuator pads 24 form an array beneath the membrane 10. Although shown as three columns of seven pads each, the actuator pads may be arrayed in any desired matrix. As shown in FIG. 3, an incident optical beam has a cross-sectional footprint 30 in the form of an elongated rectangle. Beams of other cross sections may, of course, be used in conjunction with the present invention. The rectangular cross section is disclosed only by way of example. As indicated at 32, the membrane 10 may be deformed by selected actuators 24 to produce a desired cross-sectional profile, as viewed from the longer side of the beam footprint 30. Unfortunately, because the membrane 30 is a continuous structure, it will be moved in a downward direction, to some degree, all over the membrane surface. Therefore, as viewed in a direction from the shorter side of the footprint 30, the membrane 10 exhibits a concave deformation, as indicated by the curve 34. The curve 32, which shows deformation with respect to the longer side of the footprint 30, is also biased by the same concave deformation as the one shown at 34. The dashed line across each of the curves 32 and 34 indicates the membrane position when there is no deformation. As mentioned earlier, the concave distortion of the membrane 10 shown at 34 is typically removed by additional optical means (not shown), such as a lens.

Figure 4:
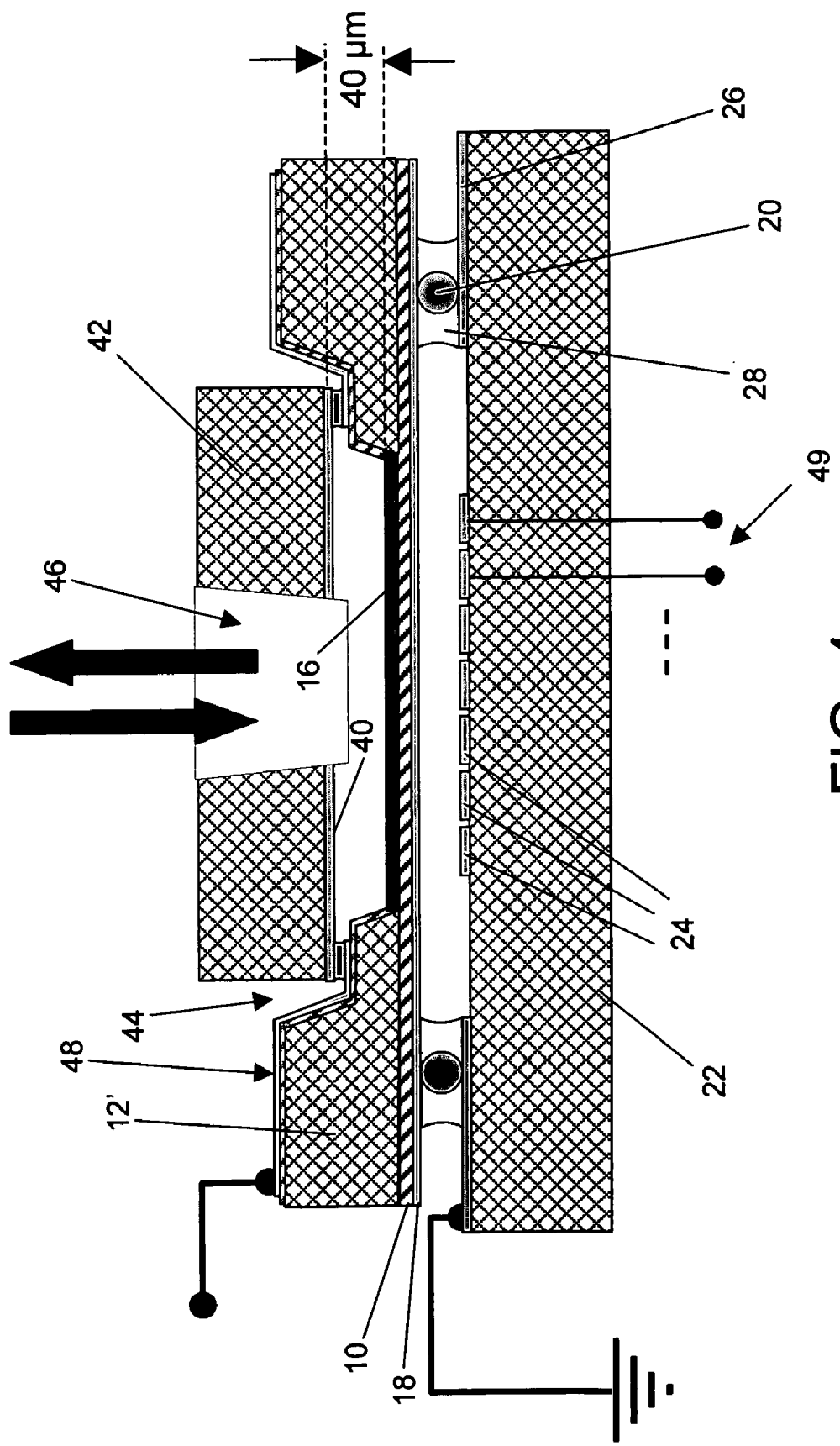
FIG. 4 is a cross-sectional view of the bi-directionally actuated thin membrane deformable mirror of the present invention.
Figure 5:
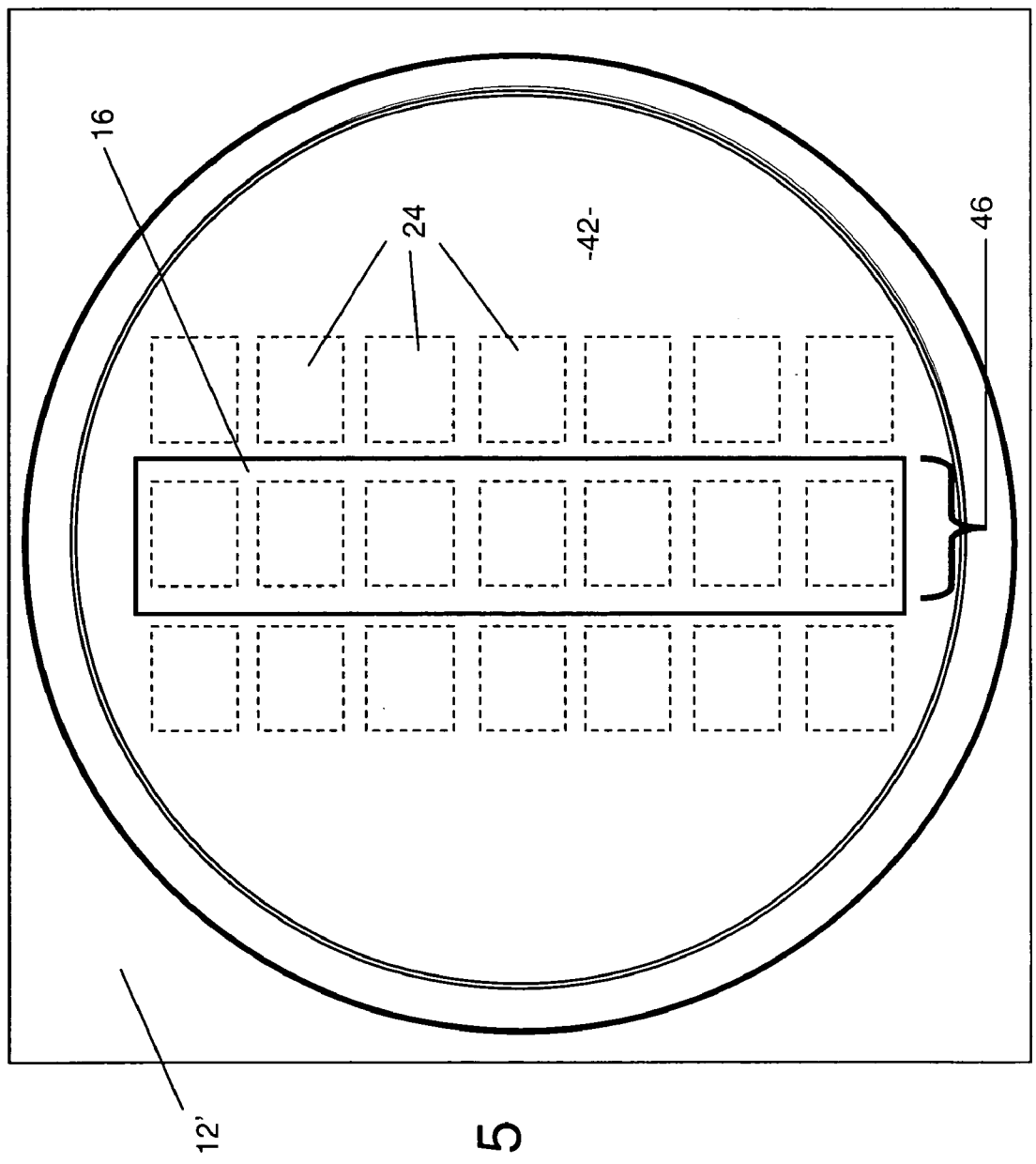
FIG. 5 is a plan view of the mirror of FIG. 3.
Figure 6:
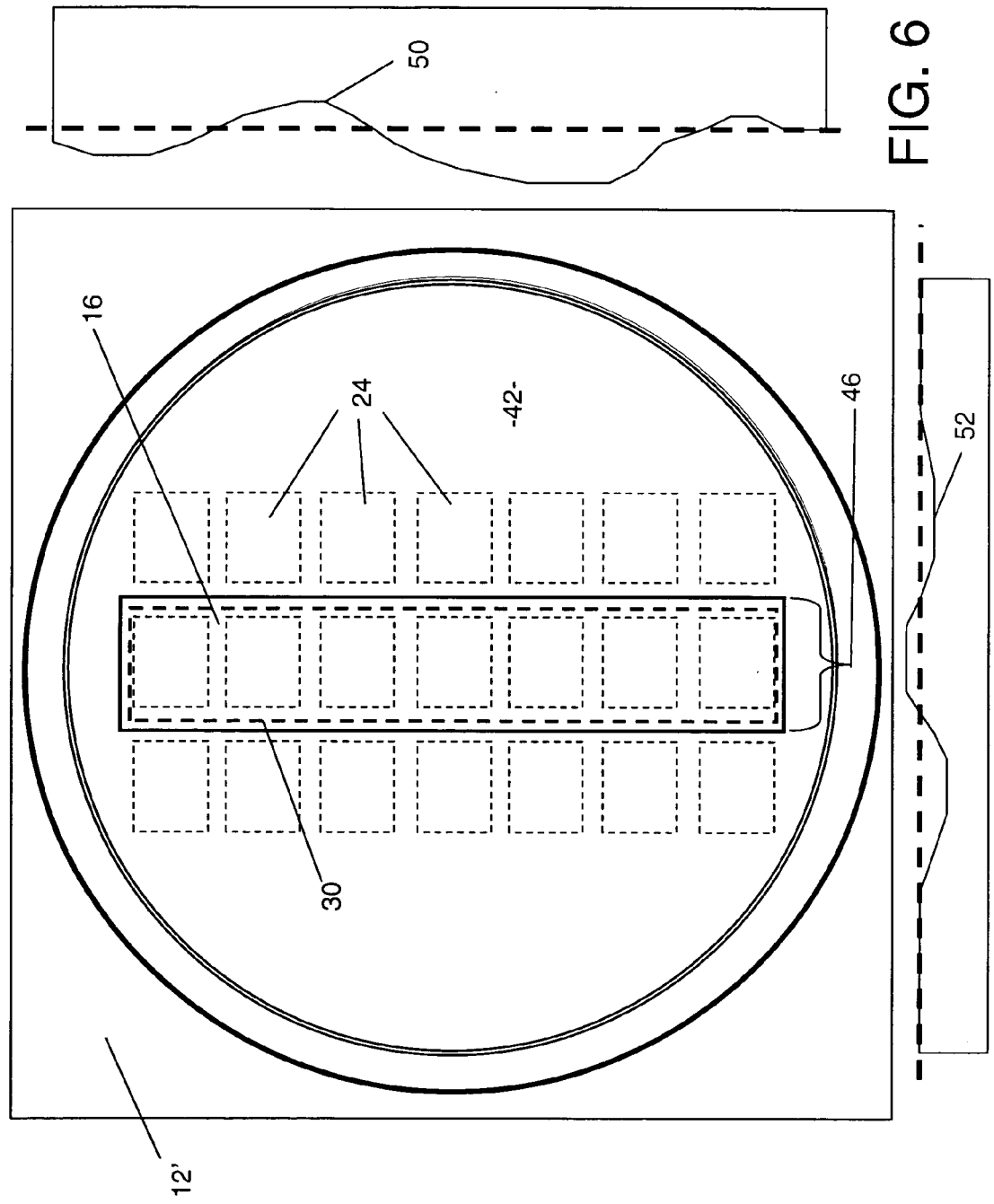
FIG. 6 is a plan view similar to FIG. 5, but also showing an optical beam footprint and the mirror surface profiles in two perpendicular directions across the mirror.

In accordance with the invention, and as shown in FIGS. 4–6, the membrane 10 may be deformed in both directions perpendicular to its surface, to minimize the concave bias inherent in the structure of FIGS. 1–3. More specifically, the membrane structure of the invention includes the same actuator pads 24 and pad array substrate 22 as in the prior art structure, but also includes at least one upper electrode plate 40 serving as a pull-up electrode and spaced above the membrane 10 by about the same distance that the actuator pads 24 are spaced below the membrane, e.g., 40 µm. The supporting structure for the upper electrode layer 40 includes an aperture plate 42. The aperture plate 42 has the upper electrode layer 40 formed on its underside, and is itself supported on a recessed shoulder 44 of a modified mirror frame 12'. The recessed shoulder 44 is sized to provide the required spacing between the upper electrode layer 40 and the membrane 10. The aperture plate 42 has an aperture 46 etched through it, providing an opening large enough to accommodate the footprint 30 of the optical beam. The shoulder 44 of the mirror frame 12' is shown as also having a conductive coating 48, to provide a conductive path to the upper electrode layer 40.

Although the upper electrode layer 40, or pull-up electrode, is shown as a single electrode extending above the membrane 10 except over the etched aperture 46, it will be appreciated that multiple upper electrodes may be employed, each independently actuated through separate conductive paths (not shown).

In operation, the membrane 10 of the invention is subject to multiple deforming forces pulling from below, depending on which of the pads 24 are actuated by the application of actuating voltages, as indicated at 49, and to additional deforming forces pulling from above, depending on the degree to which the upper electrode layer 40, or independent segments of this layer, are actuated by other independent voltage sources. By way of example, the mirror surface cross-sectional profile indicated at 50 (FIG. 6) depicts a desired mirror profile. It will be noted from the position of the broken line through this profile that the mirror is deformed in both directions from this original position line. Further, as indicated at 52 (FIG. 6), the surface profile as viewed along a direction perpendicular to the longer side of the beam footprint 30 is not distorted into a single concave shape. Rather, although there is still some distortion, a central region corresponding to the position of the beam footprint 30 is relatively uniform from one long side of the beam footprint to the other.

The technique of the invention can produce high spatial frequency deformations in a mirror surface without the focus problems usually associated with thin membrane deformable mirrors. This greatly increases the utility of the deformable mirror in most wavefront-correction applications, in which the extraneous focus term is considered undesirable. The new approach retains the advantages of localized control, speed of operation, and low cost associated with conventional membrane deformable mirrors. It also retains the advantage of being able to use standard semiconductor processing techniques to achieve mass production at a low unit cost.

It will be appreciated from the drawings that the optical beam footprint 30 must be smaller than the upper electrode 40 pattern, so that electrodes outside the footprint can influence the shape of the membrane 10 under the footprint.

An alternative to providing the top electrode layer 40 on an aperture plate 42 as shown is to provide a top plate with optically transparent electrodes that may extend across the beam footprint 40. For example a tin oxide material may be used for the electrodes. This solution would not, however, be acceptable in some applications because the optical beam would be subject to attenuation and possible wavefront distortion during the necessary two passes through the transparent electrodes. Accordingly, use of the aperture plate 42 to support the upper electrode layer 44 is believed to be the best practical alternative form of the invention.

It will be appreciated from the foregoing that the present invention represents a significant advance in the field of deformable mirrors. In particular, the invention overcomes an inherent drawback to thin membrane deformable mirrors. It will also be appreciated that, although an embodiment of the invention has been described in detail for purposes of illustration, various modifications may be made without departing from the spirit and scope of the invention. Accordingly, the invention should not be limited except as by the appended claims.

The invention claimed is:

1. A thin membrane deformable mirror, comprising:
    a deformable membrane having a mirrored front face and a back face;
    a mirror frame for supporting the deformable membrane;
    a set of independently controllable electrodes spaced from the back face of the membrane;
    at least one additional electrode spaced from the front face of the membrane;
    an aperture plate supported on a recessed shoulder of the mirror frame to provide support for the at least one additional electrode; and
    means for applying actuating electrical voltages to the set of electrodes, to deform the membrane to a desired surface profile needed to apply wavefront corrections to an optical beam impinging on the mirror, and to the at least one additional electrode, to compensate at least in part for any concave bias in the surface profile resulting from actuation of the set of electrodes.

2. A thin membrane deformable mirror as defined in claim 1, and further comprising:
    a substrate supporting the set of electrodes spaced from the back face of the membrane; and
    a spacer member supported on the substrate;
    wherein the deformable membrane is, in turn, supported on the spacer member, to maintain the set of electrodes at a desired distance from the deformable membrane.

3. A thin membrane deformable mirror as defined in claim 2,
    wherein the aperture plate has an aperture through which the optical beam is directed.

4. A thin membrane deformable mirror as defined in claim 3, wherein:
    the means for applying actuating electrical voltages include a conductive coating on the mirror frame and the aperture plate.

5. A thin membrane deformable mirror as defined in claim 1, wherein:
    the deformable membrane has a conductive layer on the back face.

6. A thin membrane deformable mirror as defined in claim 5, wherein the conductive layer comprises gold.

7. A thin membrane deformable mirror as defined in claim 1, wherein the recessed shoulder provides the space between the at least one additional electrode and the membrane.

8. A method for deforming a thin membrane deformable mirror, comprising the steps of:
    holding a deformable membrane in a mirror frame, the deformable membrane having a mirrored front face and a back face;
    locating a set of electrodes in spaced relation to the back face of the deformable membrane;
    locating at least one additional electrode in spaced relation to the front face of the deformable membrane;
    locating an aperture plate on a recessed shoulder of the mirror frame to provide support for the at least one additional electrode;
    applying voltage control signals to the set of electrodes and to the at least one additional electrode; and
    deforming the deformable mirror to attain a surface profile to effect wavefront corrections to an optical beam impinging on the mirror, without imposing a concave bias on the surface profile.

9. The method for deforming the thin membrane deformable mirror as defined in claim 8, wherein the recessed shoulder provides the spaced relation between the at least one additional electrode and the deformable membrane.

* * * * *